United States Patent
Kao

(10) Patent No.: US 7,593,240 B2
(45) Date of Patent: Sep. 22, 2009

(54) FIXING MECHANISM FOR FIXING A SWITCH AND RELATED ELECTRONIC DEVICE

(75) Inventor: Ming-Hui Kao, Taipei Hsien (TW)

(73) Assignee: Wistron Corporation, Hsi-Chih, Taipei Hsien (TW)

( * ) Notice: Subject to any disclaimer, the term of this patent is extended or adjusted under 35 U.S.C. 154(b) by 21 days.

(21) Appl. No.: 12/108,520

(22) Filed: Apr. 24, 2008

(65) Prior Publication Data
US 2009/0180270 A1    Jul. 16, 2009

(30) Foreign Application Priority Data
Jan. 10, 2008    (TW) ............................... 97200619 U

(51) Int. Cl.
  *H05K 7/02*  (2006.01)
  *H05K 7/04*  (2006.01)
(52) U.S. Cl. ...................................... 361/807; 361/810
(58) Field of Classification Search ................. 361/720, 361/760, 736, 748, 807, 810; 174/138
See application file for complete search history.

(56) References Cited

U.S. PATENT DOCUMENTS

| | | | | |
|---|---|---|---|---|
| 5,754,412 A * | 5/1998 | Clavin | | 361/804 |
| 6,700,798 B2 * | 3/2004 | Ribeiro | | 361/804 |
| 6,726,505 B2 * | 4/2004 | Cermak et al. | | 439/567 |
| 6,985,367 B1 * | 1/2006 | Scigiel | | 361/801 |
| 7,466,562 B2 * | 12/2008 | Gilliland et al. | | 361/803 |

* cited by examiner

*Primary Examiner*—Hung S Bui
(74) *Attorney, Agent, or Firm*—Winston Hsu

(57) ABSTRACT

A fixing mechanism includes a substrate having an opening. The substrate includes a first front positioning element disposed on a first side of the substrate, and a first rear positioning element disposed on a second side of the substrate. The fixing mechanism further includes a fixing component. The fixing component includes a main body for containing a switch, a first front fixing element connected to the main body, a second front fixing element connected to the main body wherein the first and the second front fixing elements are located on a same plane substantially, a first rear fixing element connected to the main body wherein there is a gap between the first front fixing element and the first rear fixing element, and a second rear fixing element connected to the main body wherein the first and the second rear fixing elements are located on a same plane substantially.

30 Claims, 12 Drawing Sheets

FIXING MECHANISM FOR FIXING A SWITCH AND RELATED ELECTRONIC DEVICE

BACKGROUND OF THE INVENTION

1. Field of the Invention

The present invention relates to a fixing mechanism and a related electronic device, and more particularly, to a fixing mechanism for fixing a switch and a related electronic device.

2. Description of the Prior Art

A tact switch is widely used for a power switch of an electronic device. In general, the tact switch wired to a motherboard is fixed on a casing by a switch holder. For example, please refer to FIG. 1 and FIG. 2. FIG. 1 and FIG. 2 are diagrams of switch devices 10, 30 in the prior art. As shown in FIG. 1, the switch device 10 includes a switch 12, and a fixing component 14. The fixing component 14 includes at least one hook 16, and at least one wing 18. The hook 16 is disposed in front of the wing 18. For assembly, the switch 12 is wedged into the fixing component 14, and then the fixing component 14 is inserted into an opening 22 on a casing 20 outwardly so that the fixing component 14 can be fixed on the casing 20 by the hook 16. However, the switch 12 might sink inside the opening 22 when the switch 12 is pressed due to insufficient strength of the hook 16.

For solving the above-mentioned problem, the switch device 30 as shown in FIG. 2 is disclosed. The switch device 30 includes a switch 32 and a fixing component 34. The fixing component 34 includes at least one hook 36, and at least one wing 38. The hook 16 is disposed in front of the wing 18. The difference between the switch device 30 and the switch device 10 is that the wing 38 is disposed in front of the hook 36. Although this design can solve the sinkage problem, it causes difficulty of assembly. The switch 32 has to cross through a casing 40 outwardly, and then the switch 32 is wedged in the fixing component 34. At last, the fixing component 34 is inserted into an opening inwardly so that the fixing component 34 can be fixed on the casing 40 by the hook 36. It results in difficulty of assembly. There is a need to design a fixing mechanism for fixing a switch stably and capable of being assembled easily.

SUMMARY OF THE INVENTION

It is therefore a primary objective of the invention to provide a fixing mechanism for fixing a switch and a related electronic device for solving the above-mentioned problem.

According to the claimed invention, a fixing mechanism for fixing a switch is disclosed. The fixing mechanism includes a substrate having an opening including a first front positioning element disposed on a first side of the substrate, and a first rear positioning element disposed on a second side of the substrate. The fixing mechanism further includes a fixing component fixed on the substrate including a main body for containing a switch, a first front fixing element connected to the main body, a second front fixing element connected to the main body and disposed coplanarly with the first front fixing element substantially, a first rear fixing element connected to the main body, a gap being formed between the first front fixing element and the first rear fixing element, and a second rear fixing element connected to the main body and disposed coplanarly with the first rear fixing element substantially. The first front fixing element contacts against the first front positioning element and the first rear fixing element contacts against the first rear positioning element so as to restrict rotation of the fixing component and the second front fixing element and the second rear fixing element clamp the substrate so as to restrict movement of the fixing component after the first front fixing element and the second front fixing element cross though the opening on the substrate and the fixing component rotates at an angle.

According to the claimed invention, an electronic device includes a switch, and a fixing mechanism for fixing the switch. The fixing mechanism includes a substrate having an opening including a first front positioning element disposed on a first side of the substrate, and a first rear positioning element disposed on a second side of the substrate. The fixing mechanism further includes a fixing component fixed on the substrate including a main body for containing a switch, a first front fixing element connected to the main body, a second front fixing element connected to the main body and disposed coplanarly with the first front fixing element substantially, a first rear fixing element connected to the main body, a gap being formed between the first front fixing element and the first rear fixing element, and a second rear fixing element connected to the main body and disposed coplanarly with the first rear fixing element substantially. The first front fixing element contacts against the first front positioning element and the first rear fixing element contacts against the first rear positioning element so as to restrict rotation of the fixing component and the second front fixing element and the second rear fixing element clamp the substrate so as to restrict movement of the fixing component after the first front fixing element and the second front fixing element cross though the opening on the substrate and the fixing component rotates at an angle.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
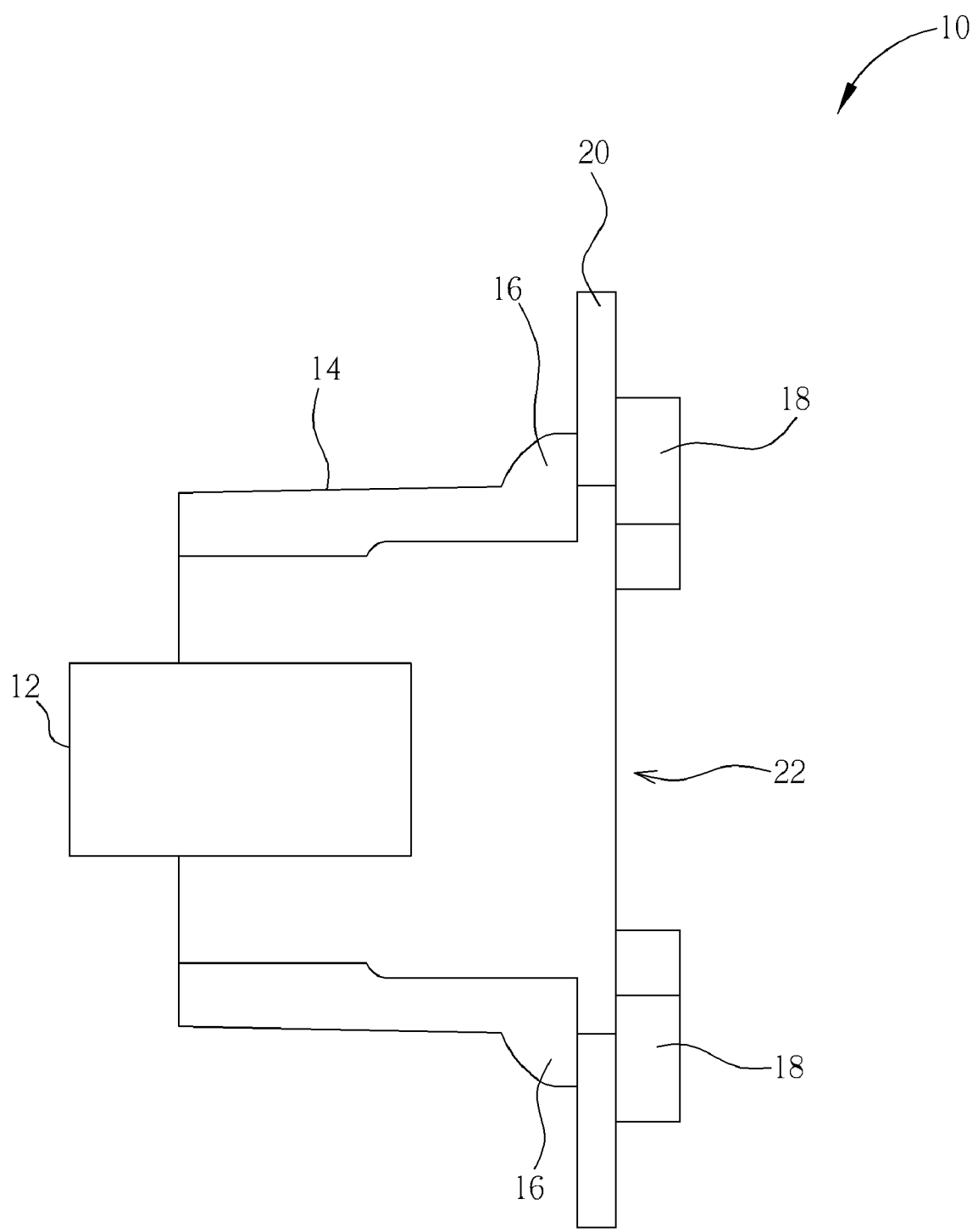
FIG. 1 and FIG. 2 are diagrams of switch devices in the prior art.
Figure 2:
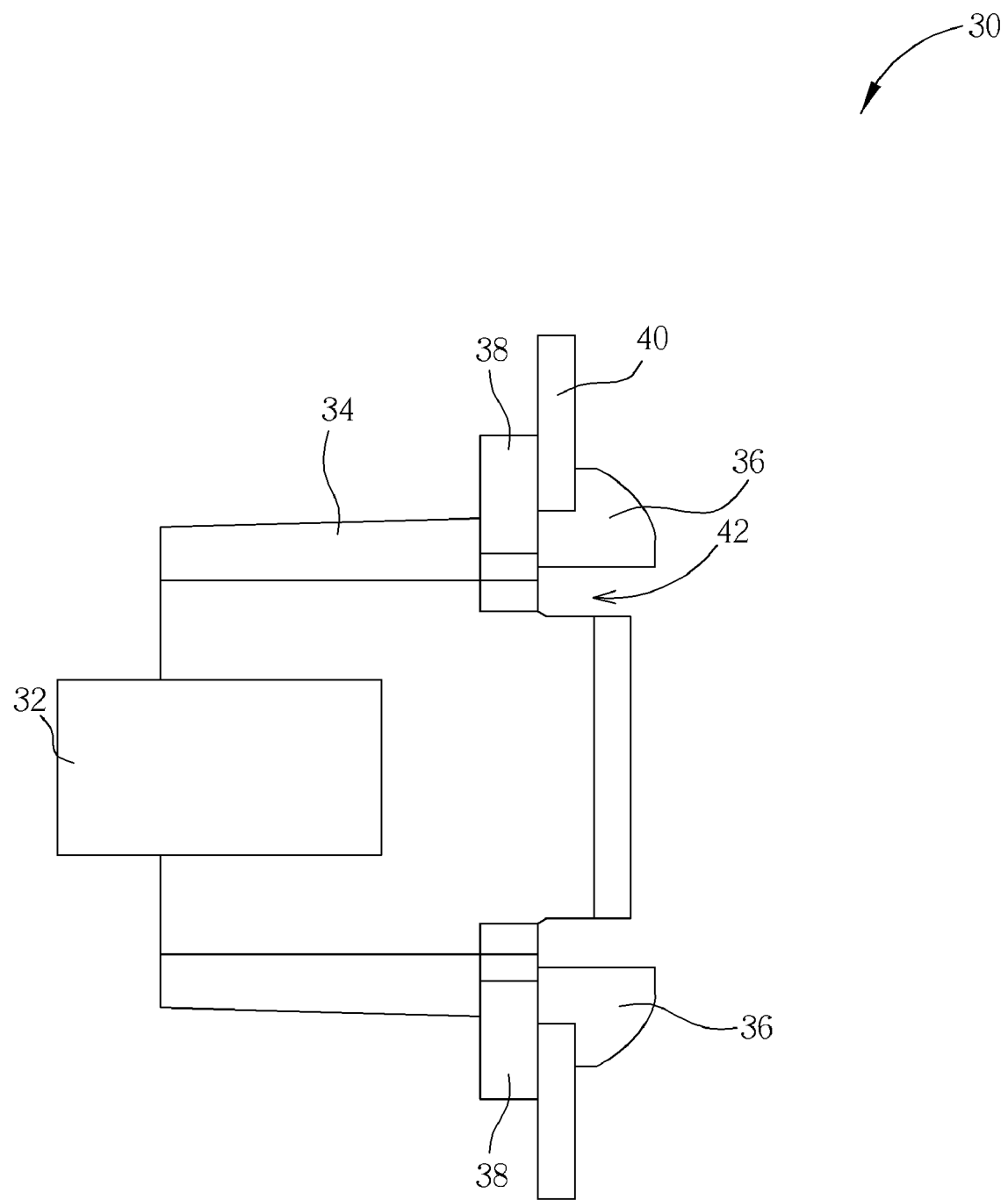
Figure 3:
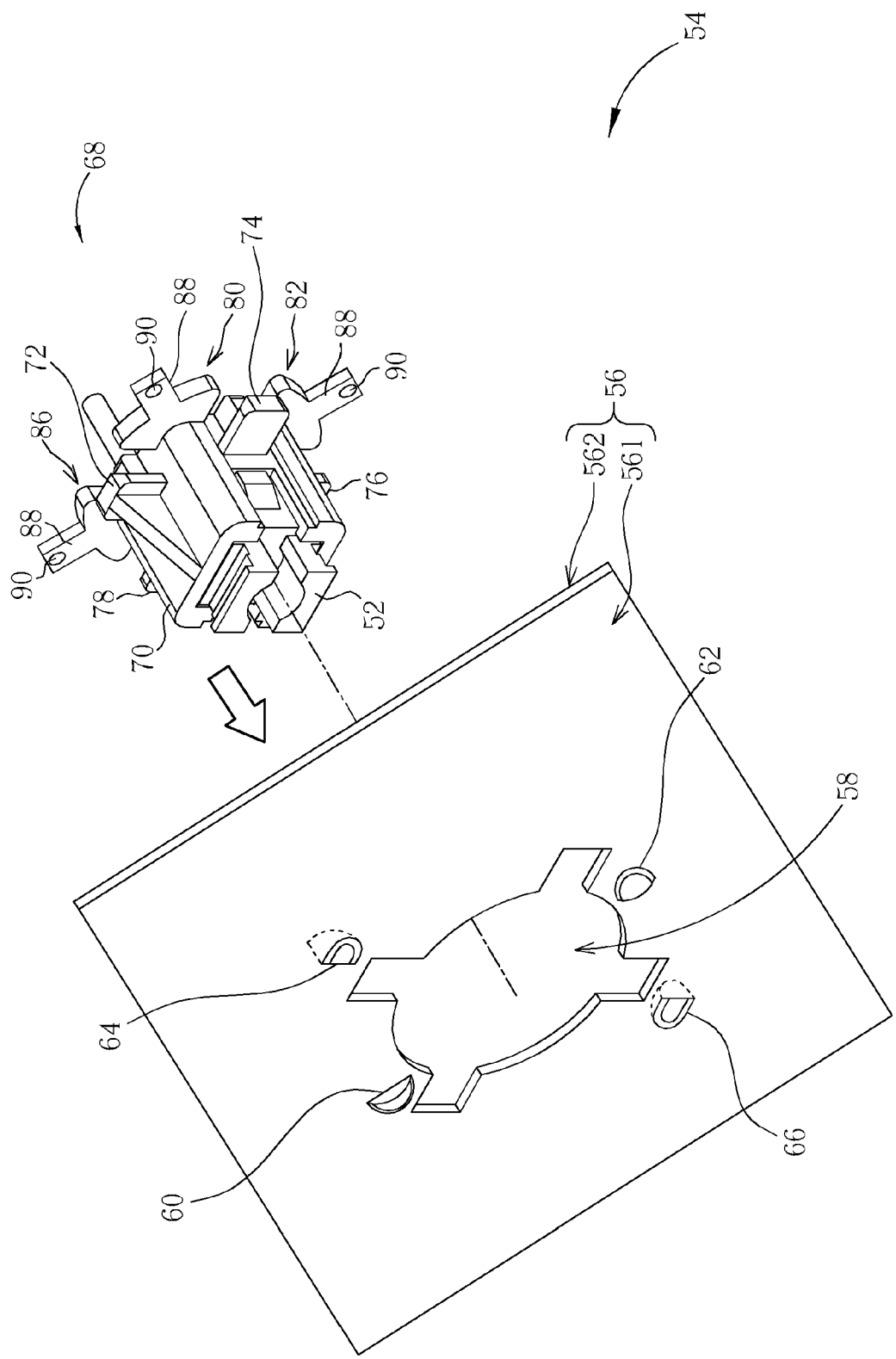
FIG. 3 is a schematic drawing of a fixing mechanism for fixing a switch of an electronic device according to a preferred embodiment of the present invention.

Please refer to FIG. 3. FIG. 3 is a schematic drawing of a fixing mechanism 54 for fixing a switch 52 of an electronic device according to a preferred embodiment of the present invention. The fixing mechanism 54 includes a substrate 56, which can be an iron plate of a casing. An opening 58 is formed on the substrate 56. The opening 58 on the substrate 56 can be an X-shaped opening. The substrate 56 includes a first front positioning element 60 disposed on a first side 561 of the substrate 56, a second front positioning element 62 disposed on the first side 561 of the substrate 56, a first rear positioning element 64 disposed on a second side 562 of the substrate 56, and a second rear positioning element 66 disposed on the second side 562 of the substrate 56. The first front positioning element 60, the second front positioning element 62, the first rear positioning element 64, and the second rear positioning element 66 can be a protrusion respectively. The first front positioning element 60, the second front positioning element 62, the first rear positioning element 64, and the second rear positioning element 66 can be formed by stamping the substrate 56 or connected to the substrate 56 as additional element.

Figure 4:
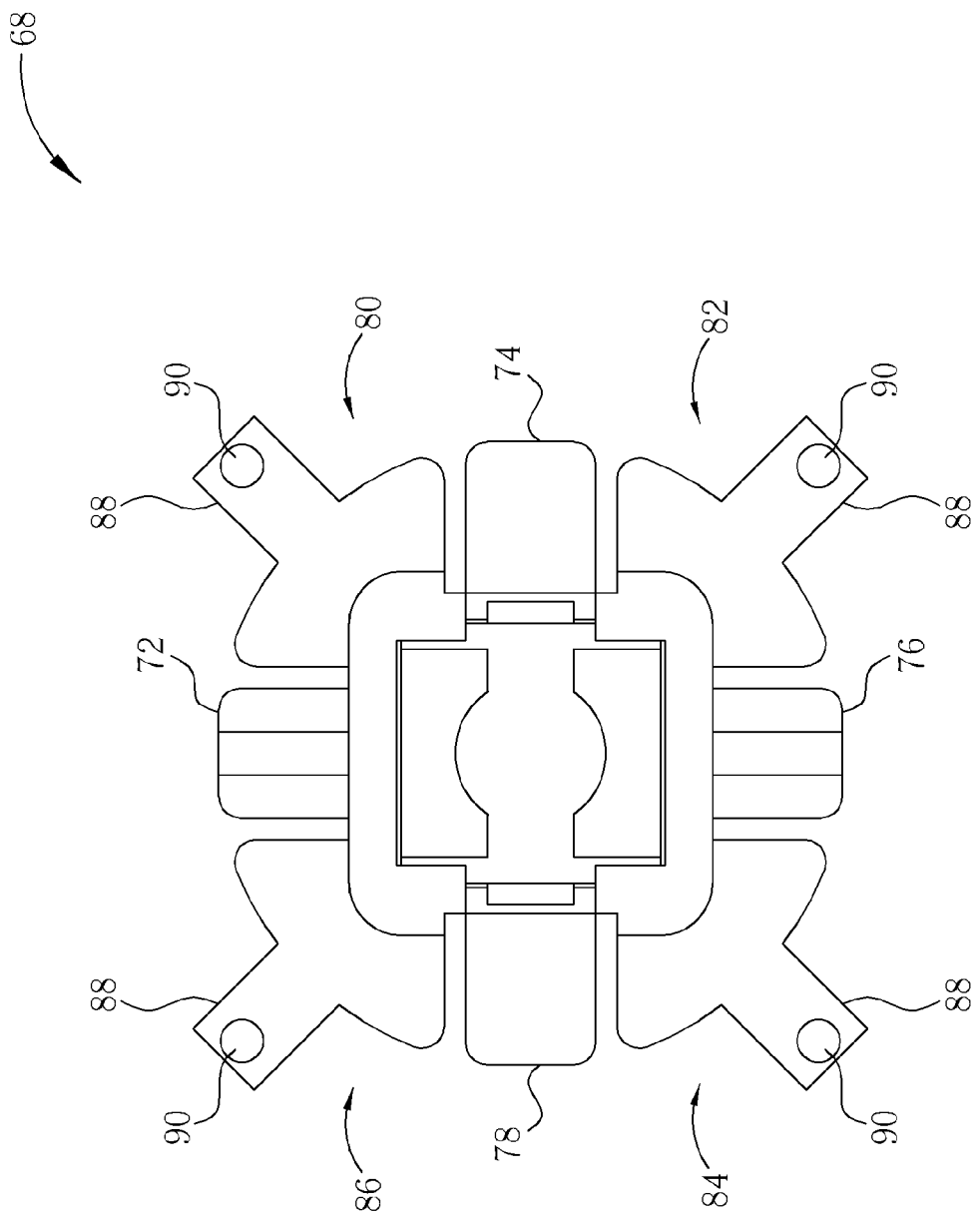
FIG. 4 is a front view of a fixing component according to the preferred embodiment of the present invention.
Figure 5:
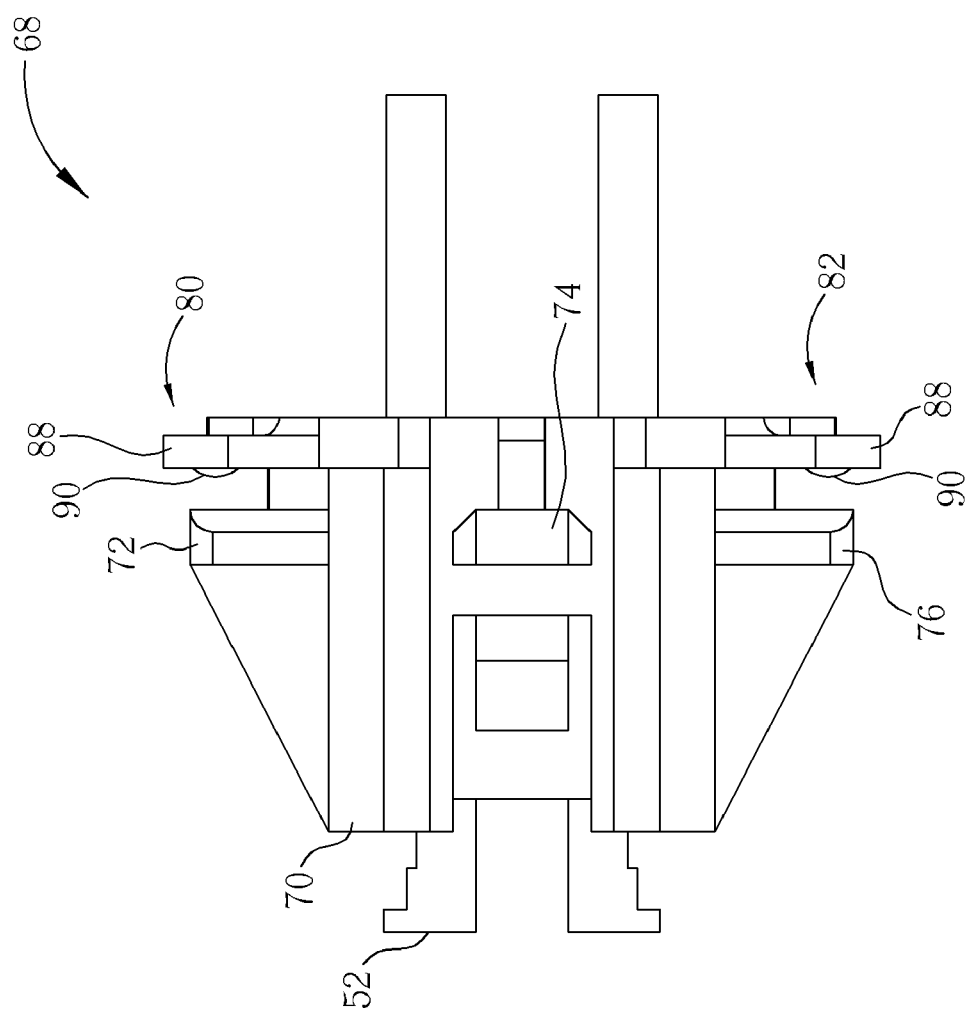
FIG. 5 is a lateral view of the fixing component according to the preferred embodiment of the present invention.

The fixing mechanism 54 further includes a fixing component 68 fixed on the substrate 56. Please refer to FIG. 3, FIG. 4, and FIG. 5. FIG. 4 is a front view of the fixing component 68 according to the preferred embodiment of the present invention. FIG. 5 is a lateral view of the fixing component 68 according to the preferred embodiment of the present invention. The fixing component 68 includes a main body 70, a first front fixing element 72, a second front fixing element 74, a third front fixing element 76, a fourth front fixing element 78, a first rear fixing element 80, a second rear fixing element 82, a third rear fixing element 84, and a fourth rear fixing element 86. The main body 70 is for containing the switch 52. The switch 52 can be a tact switch. The first front fixing element 72, the second front fixing element 74, the third front fixing element 76, and the fourth front fixing element 78 are connected to the main body 70 and on a same plane substantially. The first front fixing element 72, the second front fixing element 74, the third front fixing element 76, and the fourth front fixing element 78 can be a wing element respectively. The first rear fixing element 80, the second rear fixing element 82, the third rear fixing element 84, and the fourth rear fixing element 86 are connected to the main body 70 and on a same plane substantially. There is a gap between the first front fixing element 72, the second front fixing element 74, the third front fixing element 76, and the fourth front fixing element 78 and the first rear fixing element 80, the second rear fixing element 82, the third rear fixing element 84, and the fourth rear fixing element 86 so that the substrate 56 can be clamped inside the gap. The first rear fixing element 80, the second rear fixing element 82, the third rear fixing element 84, and the fourth rear fixing element 86 can be a wing element respectively. Each of the first rear fixing element 80, the second rear fixing element 82, the third rear fixing element 84, and the fourth rear fixing element 86 includes a fragment 88, and a protrusion 90 disposed on the fragment 88 for stopping the substrate 56.

Figure 6:
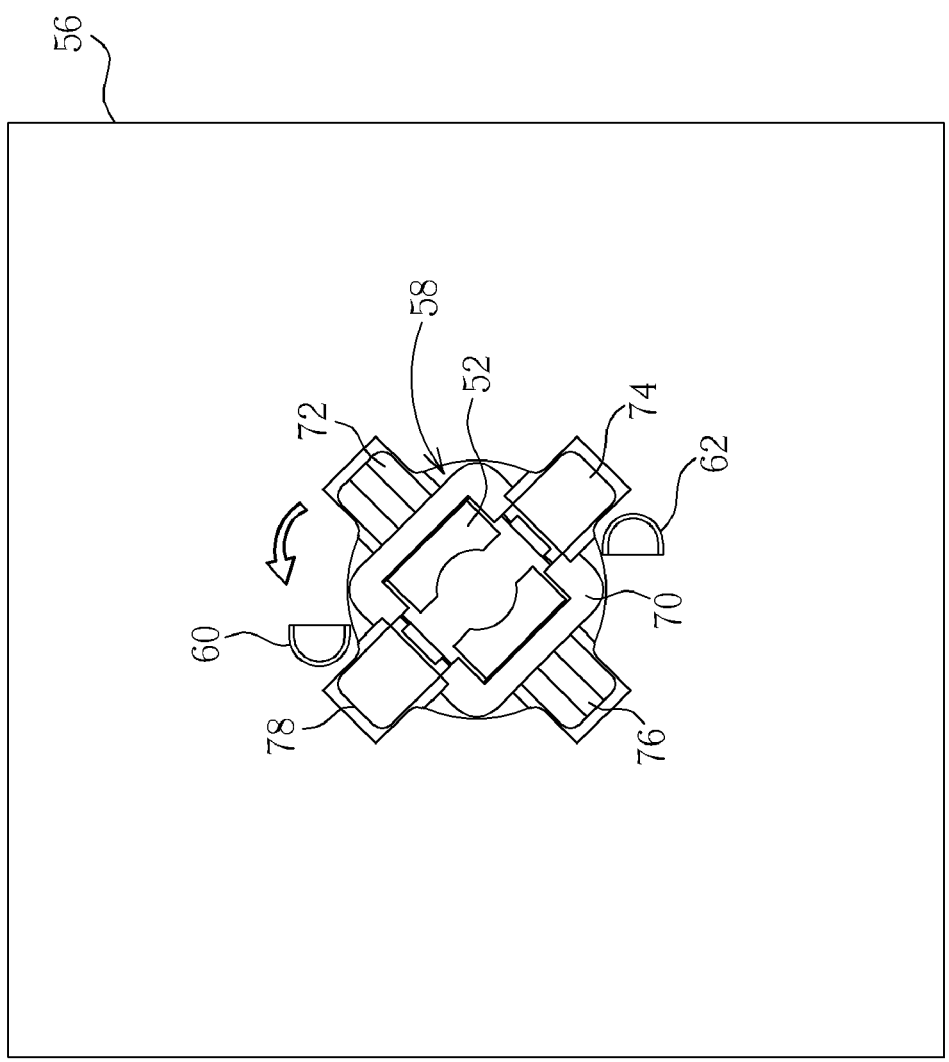
FIG. 6 is a front view of the fixing component having not been assembled on a substrate according to the preferred embodiment of the present invention.
Figure 7:
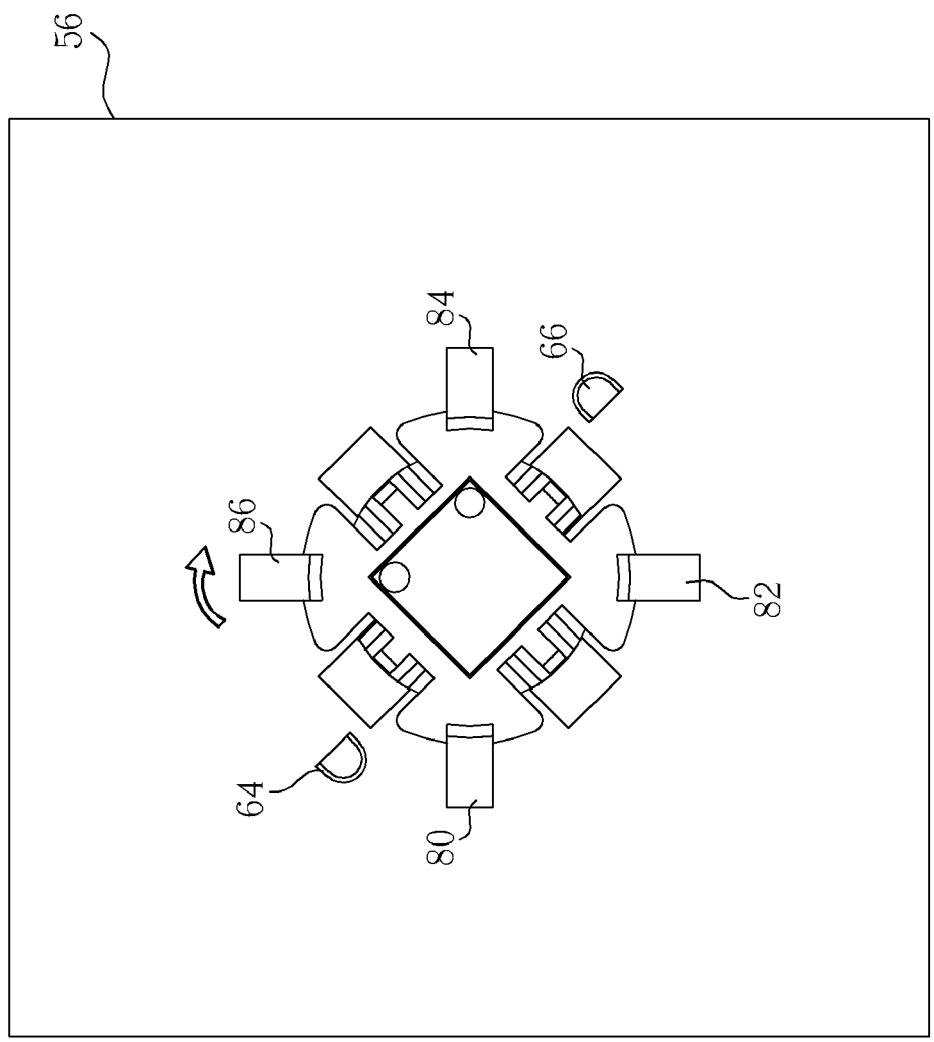
FIG. 7 is a rear view of the fixing component having not been assembled on the substrate according to the preferred embodiment of the present invention.
Figure 8:
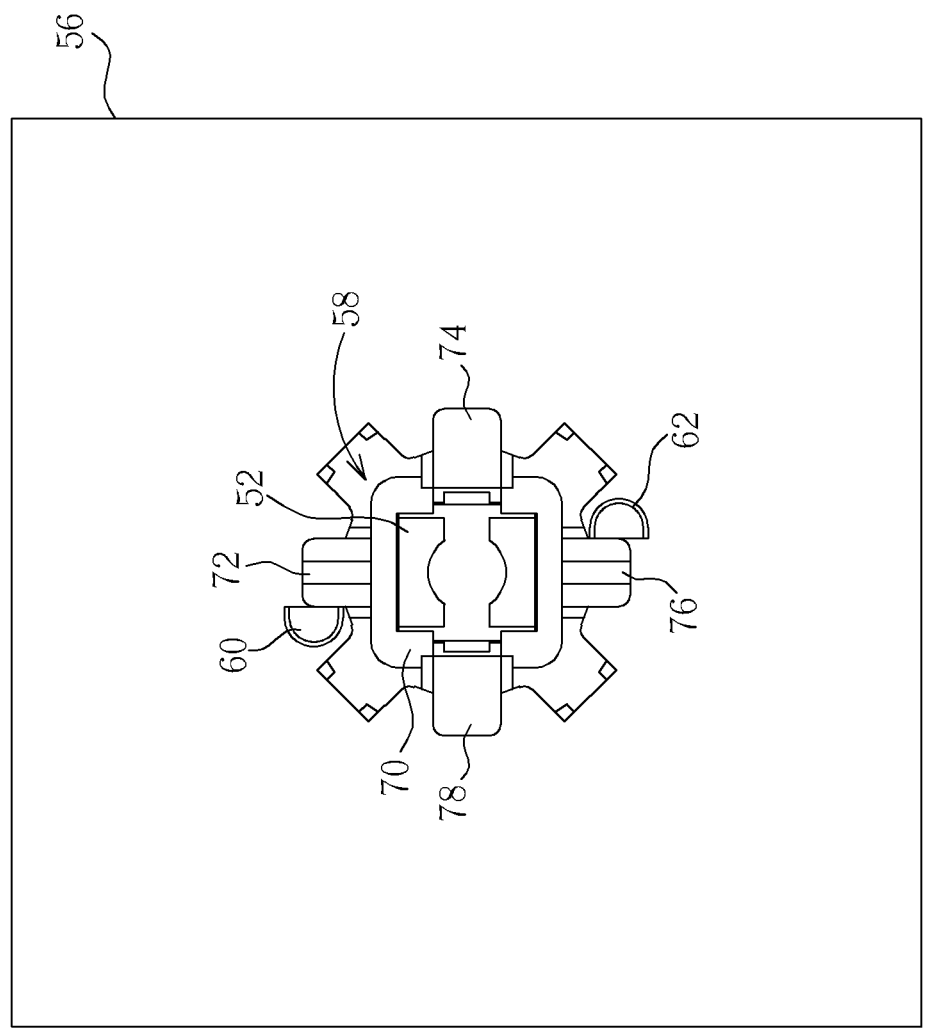
FIG. 8 is a front view of the fixing component having been assembled on the substrate according to the preferred embodiment of the present invention.
Figure 9:
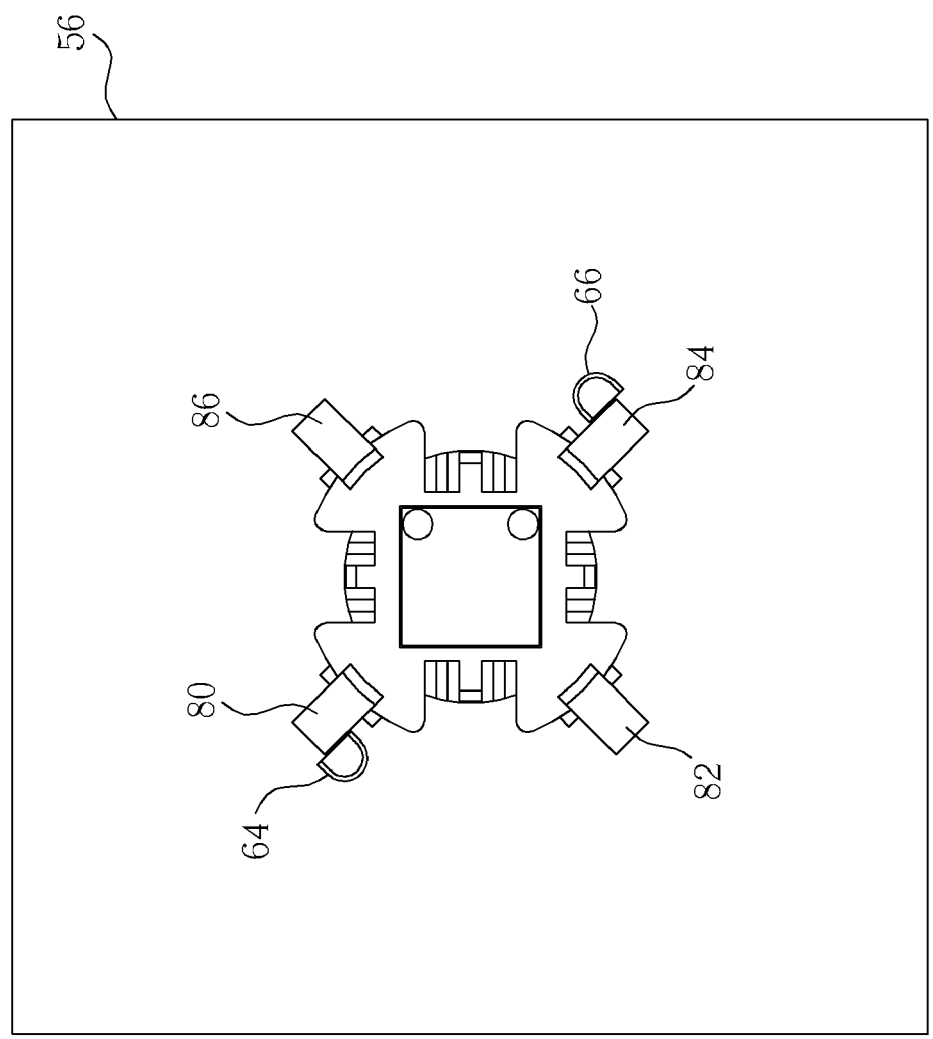
FIG. 9 is a rear view of the fixing component having been assembled on the substrate according to the preferred embodiment of the present invention.
Figure 10:
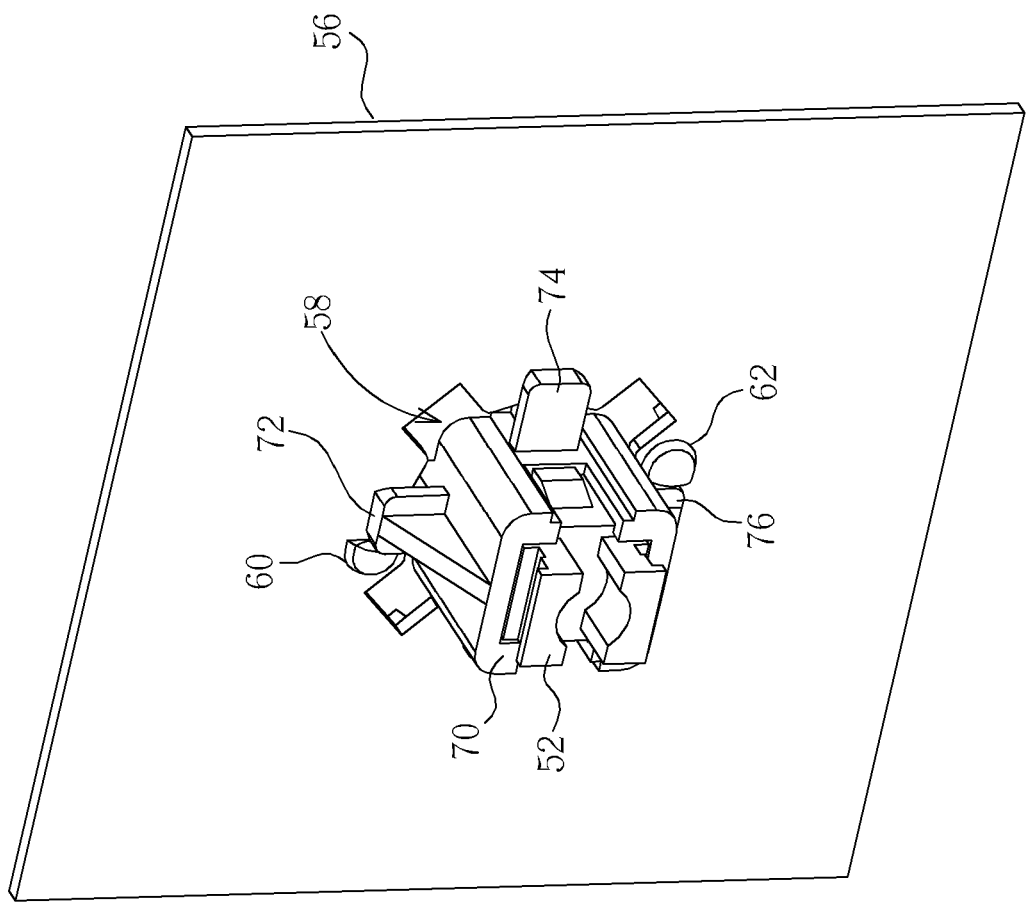
FIG. 10 and FIG. 11 are schematic drawings of the fixing component having assembled on the substrate according to the preferred embodiment of the present invention.
Figure 11:
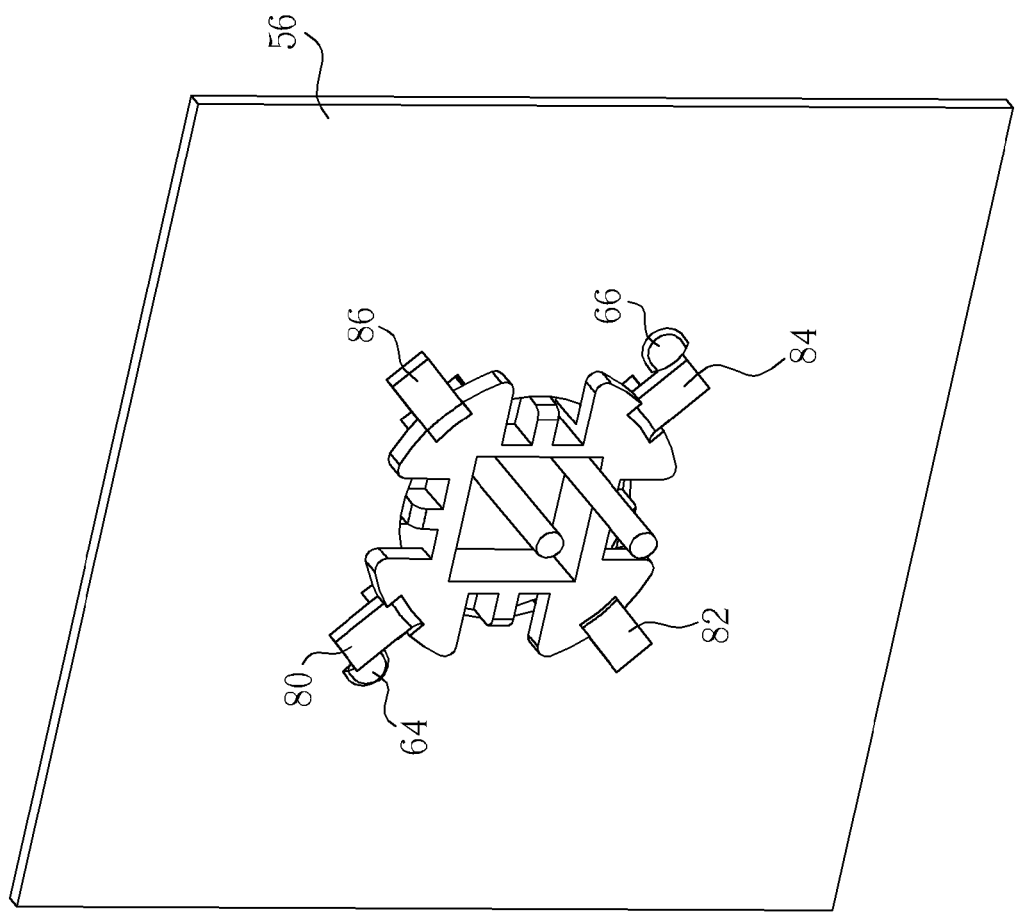
Figure 12:
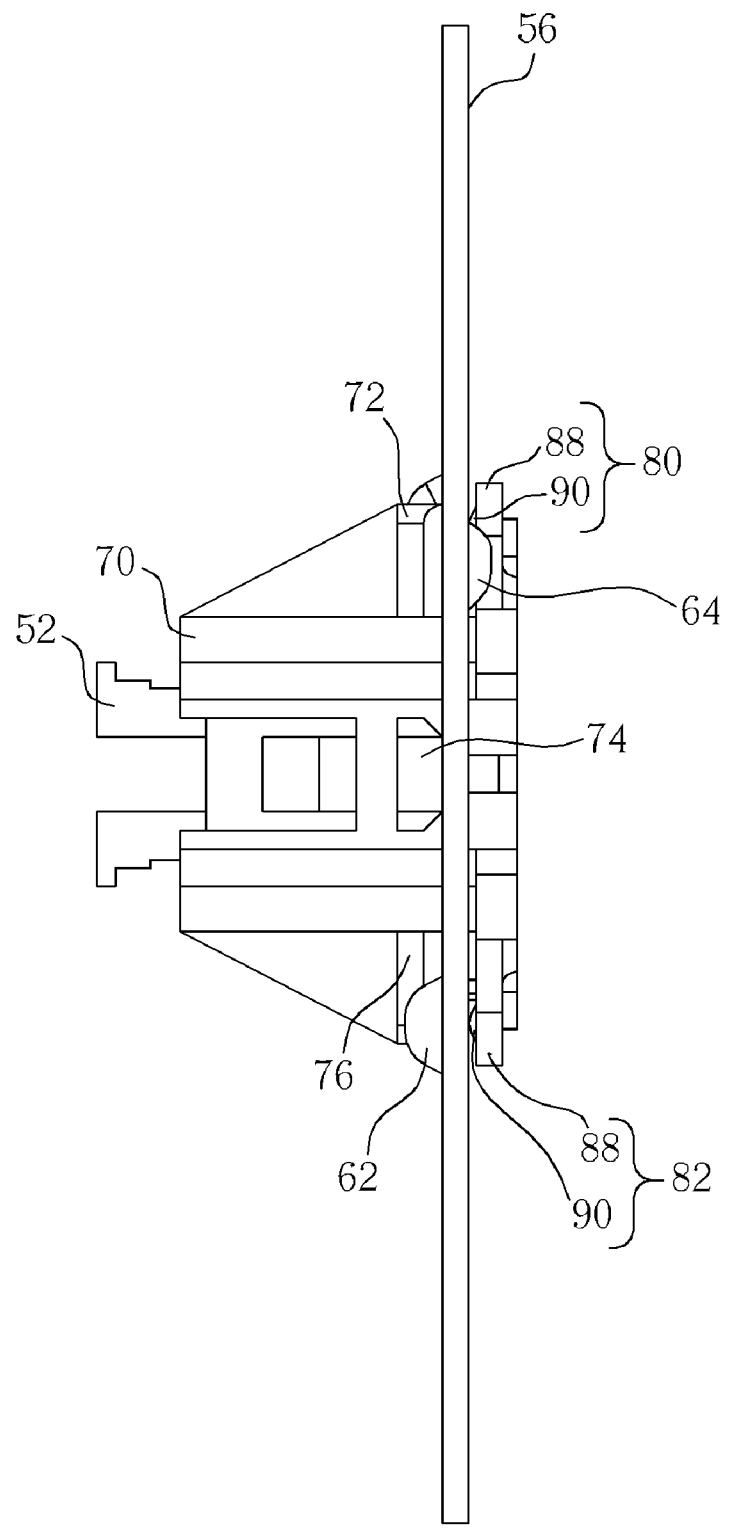
FIG. 12 is a lateral view of the fixing component having been assembled on the substrate according to the preferred embodiment of the present invention.

Please refer to FIG. 6 to FIG. 12. FIG. 6 is a front view of the fixing component 68 having not been assembled on the substrate 56 according to the preferred embodiment of the present invention. FIG. 7 is a rear view of the fixing component 68 having not been assembled on the substrate 56 according to the preferred embodiment of the present invention. FIG. 8 is a front view of the fixing component 68 having been assembled on the substrate 56 according to the preferred embodiment of the present invention. FIG. 9 is a rear view of the fixing component 68 having been assembled on the substrate 56 according to the preferred embodiment of the present invention. FIG. 10 and FIG. 11 are schematic drawings of the fixing component 68 having assembled on the substrate 56 according to the preferred embodiment of the present invention. FIG. 12 is a lateral view of the fixing component 68 having been assembled on the substrate 56 according to the preferred embodiment of the present invention. As shown in FIG. 6 and FIG. 7, the switch 52 is wedged inside the main body 70 of the fixing component 68, and then the first front fixing element 72, the second front fixing element 74, the third front fixing element 76, and the fourth front fixing element 78 aim at four branches of the X-shaped opening 58 and cross through the opening 58 on the substrate 56. After the first front fixing element 72, the second front fixing element 74, the third front fixing element 76, and the fourth front fixing element 78 cross through the opening 58 on the substrate 56 completely, the substrate 56 can be clamped between the front fixing elements and the rear fixing elements so as to restrict movement perpendicular to the substrate 56 of the fixing component 68.

Then the fixing component 68 rotates at an angle at arrow direction shown in figures so that the fixing component 68 switches to a position as shown in FIG. 8 to FIG. 12. At this time, the first front fixing element 72 contacts against the first front positioning element 60, the third front fixing element 76 contacts against the second front positioning element 62, the first rear fixing element 80 contacts against the first rear positioning element 64, and the third rear fixing element 84 contacts against the second rear positioning element 66 so as to restrict clockwise and counterclockwise rotation of the fixing component 68. Simultaneously, the second front fixing element 74, the fourth front fixing element 78, the second rear fixing element 82, and the fourth rear fixing element 86 clamp the substrate 56 together so as to restrict movement perpendicular to the substrate 56 of the fixing component 68. In conclusion, the front fixing elements and the rear fixing elements of the fixing component 68 can restrict rotation and movement perpendicular to the substrate 56 of the fixing component 68 so that the switch 52 can be fixed on the casing. In addition, as shown in FIG. 12, the protrusion 90 on the fragment 88 of each rear fixing element stops the substrate 56. The fragment 88 made of elastic material can deform so as to overcome interference of the first rear fixing element 80, the third rear fixing element 84 and the first rear positioning element 64, the second rear positioning element 66 when the fixing component 62 rotates and can offset gaps between the front fixing elements, the rear fixing elements, and the substrate 56 so as to fix the fixing component 68 stably.

In contrast to the prior art, the fixing mechanism for fixing a switch of the present invention can restrict rotation and movement perpendicular to the substrate of the fixing component for holding the switch stably. The fixing mechanism has simply structure and is capable of being assembled easily.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A fixing mechanism for fixing a switch comprising:
   a substrate having an opening, the substrate comprising:
   a first front positioning element disposed on a first side of the substrate; and
   a first rear positioning element disposed on a second side of the substrate; and a fixing component fixed on the substrate, the fixing component comprising:
a main body for containing the switch;
a first front fixing element connected to the main body;
a second front fixing element connected to the main body and disposed coplanarly with the first front fixing element substantially;
a first rear fixing element connected to the main body and having a gap disposed between the first front fixing element and the first rear fixing element; and
a second rear fixing element connected to the main body and disposed coplanarly with the first rear fixing element substantially;
wherein the first front fixing element and the second front fixing element cross through the opening of the substrate, and then the first front fixing element contacts against the first front poisoning element after rotating the fixing component at an angle, the first rear fixing element contacts against the first rear positioning element so as to restrict the rotation of the fixing component, and the second front fixing element and the second rear fixing element clamp the substrate so as to restrict the movement of the fixing component.

2. The fixing mechanism of claim 1 wherein the substrate further comprises a second front positioning element as a wing element disposed on the first side of the substrate; the fixing component further comprises a third front fixing element as a wing element connected to the main body, the first front fixing element asa wing element contacts against the first fronting positioning element, the first rear fixing element as a wing element contacts against the first rear positioning element, and the third front fixing element contacts against the second front positioning element so as to restrict rotation of the fixing component after the first front fixing element, the second front fixing element, and the third front fixing element cross though the opening of the substrate and the fixing component rotates at the angle.

3. The fixing mechanism of claim 2 wherein the fixing component further comprises a fourth front fixing element as a wing element connected to the main body, and the second front fixing element, the second rear fixing element, and the fourth front fixing element clamp the substrate so as to restrict movement of the fixing component after the first front fixing element, the second front fixing element, the third front fixing element, and the fourth front fixing element cross though the opening of the substrate and the fixing component rotates at the angle.

4. The fixing mechanism of claim 3 wherein the substrate further comprises a second rear positioning element as a wing element disposed on the second side of the substrate, the fixing component further comprises a third rear fixing element as a wing element connected to the main body, the first front fixing element contacts against the first fronting positioning element, the first rear fixing element contacts against the first rear positioning element, the third front fixing element contacts against the second front positioning element, and the third rear fixing element contacts against the second rear positioning element so as to restrict rotation of the fixing component after the first front fixing element, the second front fixing element, the third front fixing element, and the fourth front fixing element cross though the opening of the substrate and the fixing component rotates at the angle.

5. The fixing mechanism of claim 4 wherein the fixing component further comprises a fourth rear fixing element as a wing element connected to the main body, the second front fixing element, the second rear fixing element, the fourth front fixing element, and the fourth rear fixing element clamp the substrate so as to restrict movement of the fixing component after the first front fixing element, the second front fixing element, the third front fixing element, and the fourth front fixing element cross though the opening of the substrate and the fixing component rotates at the angle.

6. The fixing mechanism of claim 2 wherein the substrate further comprises a second rear positioning element disposed on the second side of the substrate, the fixing component further comprises a third rear fixing element connected to the main body, and the first front fixing element contacts against the first fronting positioning element, the first rear fixing element contacts against the first rear positioning element, the third front fixing element contacts against the second front positioning element, and the third rear fixing element contacts against the second rear positioning element so as to restrict rotation of the fixing component after the first front fixing element, the second front fixing element, and the third front fixing element cross though the opening on the substrate and the fixing component rotates at the angle.

7. The fixing mechanism of claim 6 wherein the fixing component further comprises a fourth rear fixing element connected to the main body, the second front fixing element, the second rear fixing element, and the fourth rear fixing element clamp the substrate so as to restrict movement of the fixing component after the first front fixing element, the second front fixing element, and the third front fixing element cross though the opening of the substrate and the fixing component rotates at the angle.

8. The fixing mechanism of claim 2 wherein the fixing component further comprises a fourth rear fixing element connected to the main body, the second front fixing element, the second rear fixing element, and the fourth rear fixing element clamp the substrate so as to restrict movement of the fixing component after the first front fixing element, the second front fixing element, and the third front fixing element cross though the opening of the substrate and the fixing component rotates at the angle.

9. The fixing mechanism of claim 2 wherein the second front positioning element or the second rear positioning element is a protrusion.

10. The fixing mechanism of claim 1 wherein the fixing component further comprises a fourth front fixing element connected to the main body, the second front fixing element, the second rear fixing element, and the fourth front fixing element clamp the substrate so as to restrict movement of the fixing component after the first front fixing element, the second front fixing element, and the fourth front fixing element cross though the opening of the substrate and the fixing component rotates at the angle.

11. The fixing mechanism of claim 10 wherein the substrate further comprises a second rear positioning element disposed on the second side of the substrate, the fixing component further comprises a third rear fixing element connected to the main body, and the first front fixing element contacts against the first fronting positioning element, the first rear fixing element contacts against the first rear positioning element, and the third rear fixing element contacts against the second rear positioning element so as to restrict rotation of the fixing component after the first front fixing element, the second front fixing element, and the fourth front fixing element cross though the opening of the substrate and the fixing component rotates at the angle.

12. The fixing mechanism of claim 11 wherein the fixing component further comprises a fourth rear fixing element connected to the main body, the second front fixing element, the second rear fixing element, the fourth front fixing element, and the fourth rear fixing element clamp the substrate so as to restrict movement of the fixing component after the first front fixing element, the second front fixing element, and the fourth front fixing element cross though the opening of the substrate and the fixing component rotates at the angle.

13. The fixing mechanism of claim 10 wherein the fixing component further comprises a fourth rear fixing element connected to the main body, the second front fixing element, the second rear fixing element, the fourth front fixing element, and the fourth rear fixing element clamp the substrate so as to restrict movement of the fixing component after the first front fixing element, the second front fixing element, and the fourth front fixing element cross though the opening on the substrate and the fixing component rotates at the angle.

14. The fixing mechanism of claim 1 wherein the substrate further comprises a second rear positioning element disposed on the second side of the substrate, the fixing component further comprises a third rear fixing element connected to the main body, and the first front fixing element contacts against the first fronting positioning element, the first rear fixing element contacts against the first rear positioning element, and the third rear fixing element contacts against the second rear positioning element so as to restrict rotation of the fixing component after the first front fixing element and the second front fixing element cross though the opening of the substrate and the fixing component rotates at the angle.

15. The fixing mechanism of claim 14 wherein the fixing component further comprises a fourth rear fixing element connected to the main body, the second front fixing element, the second rear fixing element, and the fourth rear fixing element clamp the substrate so as to restrict movement of the fixing component after the first front fixing element and the second front fixing element cross though the opening of the substrate and the fixing component rotates at the angle.

16. The fixing mechanism of claim 1 wherein the fixing component further comprises a fourth rear fixing element connected to the main body, the second front fixing element, the second rear fixing element, and the fourth rear fixing element clamp the substrate so as to restrict movement of the fixing component after the first front fixing element and the second front fixing element cross though the opening of the substrate and the fixing component rotates at the angle.

17. The fixing mechanism of claim 1 wherein the opening on the substrate is an X-shaped opening.

18. The fixing mechanism of claim 1 wherein the first front positioning element or the first rear positioning element is a protrusion.

19. The fixing mechanism of claim 1 wherein each of the first rear fixing element and the second rear fixing element comprises:
a fragment; and
a protrusion disposed on the fragment for stopping the substrate.

20. The fixing mechanism of claim 1 wherein the first front positioning element and the first rear positioning element are formed by stamping the substrate.

21. An electronic device comprising:
a switch; and
a fixing mechanism for fixing the switch, the fixing mechanism comprising:
a substrate having an opening, the substrate comprising:
a first front positioning element disposed on a first side of the substrate; and
a first rear positioning element disposed on a second side of the substrate; and
a fixing component fixed on the substrate, the fixing component comprising:
a main body for containing the switch;
a first front fixing element connected to the main body;
a second front fixing element connected to the main body and disposed coplanarly with the first front fixing element substantially;
a first rear fixing element connected to the main body and having a gap disposed between the first front fixing element and the first rear fixing element; and
a second rear fixing element connected to the main body and disposed coplanarly with the first rear fixing element substantially;
wherein the first front fixing element and the second front fixing element cross through the opening of the substrate, and then the first front fixing element contacts against the first front poisoning element after rotating the fixing component at an angle, the first rear fixing element contacts against the first rear positioning element so as to restrict the rotation of the fixing component, and the second front fixing element and the second rear fixing element clamp the substrate so as to restrict the movement of the fixing component.

22. The electronic device of claim 21 wherein the substrate further comprises a second front positioning element as a wing element disposed on the first side of the substrate, the fixing component further comprises a third front fixing element as a wing element connected to the main body, the first front fixing element as a wing element contacts against the first fronting positioning element, the first rear fixing element as a wing element contacts against the first rear positioning element, the third front fixing element contacts against the second front positioning element so as to restrict rotation of the fixing component after the first front fixing element, the second front fixing element, and the third front fixing element cross though the opening of the substrate and the fixing component rotates at the angle.

23. The electronic device of claim 22 wherein the fixing component further comprises a fourth front fixing element connected to the main body, the second front fixing element, the second rear fixing element, and the fourth front fixing element clamp the substrate so as to restrict movement of the fixing component after the first front fixing element, the second front fixing element, the third front fixing element, and the fourth front fixing element cross though the opening of the substrate and the fixing component rotates at the angle.

24. The electronic device of claim 23 wherein the substrate further comprises a second rear positioning element as a wing element disposed on the second side of the substrate, the fixing component further comprises a third rear fixing element connected to the main body, the first front fixing element contacts against the first fronting positioning element, the first rear fixing element contacts against the first rear positioning element, the third front fixing element contacts against the second front positioning element, the third rear fixing element contacts against the second rear positioning element so as to restrict rotation of the fixing component after the first front fixing element, the second front fixing element, the third front fixing element, and the fourth front fixing element cross though the opening of the substrate and the fixing component rotates at the angle.

25. The electronic device of claim 24 wherein the fixing component further comprises a fourth rear fixing element connected to the main body, the second front fixing element, the second rear fixing element, the fourth front fixing element, and the fourth rear fixing element clamp the substrate so as to restrict movement of the fixing component after the first front fixing element, the second front fixing element, the third front fixing element, and the fourth front fixing element cross though the opening of the substrate and the fixing component rotates at the angle.

26. The electronic device of claim 22 wherein the second front positioning element or the second rear positioning element is a protrusion.

27. The electronic device of claim 21 wherein the opening on the substrate is an X-shaped opening.

28. The electronic device of claim 21 wherein the first front positioning element or the first rear positioning element is a protrusion.

29. The electronic device of claim 21 wherein each of the first rear fixing element and the second rear fixing element comprises:
   a fragment; and
   a protrusion disposed on the fragment for stopping the substrate.

30. The electronic device of claim 21 wherein the first front positioning element and the first rear positioning element are formed by stamping the substrate.

* * * * *